US008218792B2

(12) United States Patent
Morey

(10) Patent No.: US 8,218,792 B2
(45) Date of Patent: Jul. 10, 2012

(54) AUTONOMOUS MIXER FOR DEVICES CAPABLE OF STORING AND PLAYING AUDIO SIGNALS

(75) Inventor: Matthew Douglas Morey, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1131 days.

(21) Appl. No.: 12/077,858

(22) Filed: Mar. 20, 2008

(65) Prior Publication Data

US 2009/0238381 A1 Sep. 24, 2009

(51) Int. Cl.
*H04B 1/00* (2006.01)

(52) U.S. Cl. .......................................... 381/119; 700/94

(58) Field of Classification Search .................. 381/119; 700/94

See application file for complete search history.

(56) References Cited

U.S. PATENT DOCUMENTS

| | | | | |
|---|---|---|---|---|
| 7,851,688 | B2 * | 12/2010 | Compton | 84/610 |
| 2004/0068648 | A1 * | 4/2004 | Lewis et al. | 713/153 |
| 2007/0137463 | A1 * | 6/2007 | Lumsden | 84/603 |
| 2007/0280489 | A1 * | 12/2007 | Roman et al. | 381/119 |
| 2008/0013756 | A1 * | 1/2008 | Roman et al. | 381/119 |
| 2008/0165989 | A1 * | 7/2008 | Seil et al. | 381/119 |

* cited by examiner

*Primary Examiner* — Douglas Menz
(74) *Attorney, Agent, or Firm* — Saliwanchik, Lloyd & Eisenschenk

(57) ABSTRACT

An apparatus and method for autonomously mixing multiple devices capable of storing and playing audio signals is provided. Multiple devices can be mixed into one standard stereo signal that can then be played on any sort of powered speakers or amplifier. The apparatus is capable of receiving multiple audio inputs and can combine multiple iPods®, iPhones®, MP3 devices, or other devices capable of storing and playing audio signals, such that more than one device can be played at one time. No human intervention is required to control the device when the device is in autonomous mode. The autonomous mode can include random song playback using multiple devices.

27 Claims, 14 Drawing Sheets

AUTONOMOUS MIXER FOR DEVICES CAPABLE OF STORING AND PLAYING AUDIO SIGNALS

BACKGROUND OF INVENTION

The Apple iPod® is one of the best-selling digital audio player series in history. With such a huge user base the iPod® accessory market is even larger, as most iPod® users own several iPod® accessories. In addition to the Apple iPod®, other portable and non-portable devices that can store and play music, including, but not limited to, desktop computers, laptop computers, the Apple iPhone® and MP3 players, are popular. Further, these devices and other similar devices can be used as video players, with or without audio.

For digital audio player consumers there is a distinct hurdle to go from unplugging the headphones to plugging multiple portable devices into a stereo system. As an example, at parties and gatherings the party goers are often left to listen to the songs of a single iPod® or manually swap iPods®.

There exists various iPod® docking stations, iPod® accessories, and DJ mixers capable of interacting with iPods®. However, a device for music mixing of signals from multiple audio devices capable of storing and playing music has not been available.

BRIEF SUMMARY

Embodiments of the subject invention pertain to a method and apparatus for mixing signals from multiple devices capable of storing and playing signal files. The signal files can be audio and/or video signal files. The signal files can be analog and/or digital signal files. In a specific embodiment, signals from multiple devices outputting audio signals can be mixed where the audio signals can be voice and/or music. In a specific embodiment, the method and apparatus allow mixing of signals from multiple iPods®. In a further embodiment, a method and apparatus is provided for mixing video signals from multiple devices capable of storing and playing video signals. In yet a further embodiment, a method and apparatus is provided for mixing audio and video from multiple devices capable of storing and playing audio and video. The embodiments can store and play audio and/or video by storing audio signal files and/or video signal files, respectively, and outputting an output audio signal and/or output video signal, respectively. In a specific embodiment, a means for producing sound and/or a means for producing video can be incorporated with the subject device such that receipt of the output audio signal and/or output video signal, respectively, allows the device to produce sound and/or video corresponding to the output audio signal and/or output video signal, respectively.

In an embodiment, audio signals from multiple devices capable of storing a plurality of audio signal files and playing audio signals can be selected for playback. The audio signals stored on each of the devices capable of storing and playing audio signals can be accessed by the subject apparatus. The subject apparatus can automatically recognize a connected device and access the audio signals on that device. The power being supplied to the subject apparatus for performing the audio signal playback can be provided from a wall socket, adapter, internal battery, or the battery of one or more of the connected devices capable of storing and playing audio signals.

According to an embodiment, the stored digital and/or analog music on multiple devices capable of storing and playing audio signals can be mixed into one audio stream which can then be outputted to, for example, an audio amplifier, such as a home stereo system or public address (PA) system. Of course, the audio stream can be outputted to any device capable of receiving an audio signal as input. In a specific embodiment, two stereo signals can be outputted by the device, one left and one right. The mixing of the various audio signals, device control, and track selection can be autonomously controlled or can include user involvement. In a further embodiment, one or more of the connected devices can be recharged via power supplied by the device.

An embodiment of the apparatus can be a consumer audio mixing device that can be used in, for example, party environments. According to an embodiment, multiple iPods® can be mixed into one standard stereo signal that can then be played on any sort of powered speakers or amplifier. The apparatus is capable of receiving multiple audio inputs and can combine multiple iPods® such that more than one iPod® can be played at one time, such that songs from different iPods® can be sequentially played based on a selected ordering pattern. No human intervention is required to control the device when the device is in autonomous mode. The autonomous mode can include, but is not limited to, random song playback using multiple iPods®, random iPod® selection with each iPod® performing a pre-defined operation, and pre-defined iPod selection with random song selection and/or pre-defined iPod® operation. Embodiments of the subject device can combine multiple iPods®, offer autonomous operation, send and receive commands using Apple's communication protocol, and recharge the iPods' batteries. Of course embodiments are not limited to Apple's iPod®.

In a specific embodiment, an apparatus is provided that can autonomously mix up to 4 iPods® and/or other devices capable of storing and playing audio signals, such as mp3 players. In further embodiments, a device can mix up to 6, 8, or more iPods® and/or other devices capable of storing and playing audio signals. Embodiments of the device can be configured that the output of a first device can be connected with the input port of a second device such that second device can access the iPods® connected to the input ports of the first device in the same manner as an iPod® connected to the input port of the second device. The apparatus can be a consumer audio mixing device, and can be used in, for example, party environments.

DETAILED DISCLOSURE

Embodiments of the present invention relate to a method and apparatus for playing music from multiple devices capable of storing and playing signal files. In specific embodiments, the multiple devices capable of storing signal files can store the signal files without receipt of an external storage medium. In specific embodiments, the audio can be voice and/or music. In a further embodiment, video can be played from multiple devices capable of storing and playing video. In yet a further embodiment, both audio and video can be played from multiple devices capable of storing and playing audio and video. Although the description is directed to mixing signals from devices capable of storing and playing audio, the description also applies to mixing multiple devices capable of storing and playing video, with or without audio.

A specific embodiment pertains to a consumer electronic device for use with multiple Apple iPods® and iPhones®. Although an exemplary embodiment capable of interconnection with multiple iPods® is described, other devices capable of storing and playing audio signals can be connected to embodiments of the subject apparatus. According to an embodiment, the subject apparatus allows the stored digital music on multiple iPods® to be mixed into a stereo audio stream. This audio stream can then be interfaced with a sound output device, such as standard powered speakers or an amplifier via a stereo connection. The mixing of the various audio signals, iPod® control, and track selection can be controlled by the subject device.

In further embodiments, the device can simultaneously recharge one or more of the connected iPods®. The power being supplied to the subject apparatus to perform the audio signal playback can be provided from a wall socket, adapter, internal battery, or the battery (or other power source) of one or more of the connected devices capable of storing and playing audio signals.

Embodiments of the subject device allow several iPods® to be connected to the device, and as a result, allow the stored music of a plurality of iPods® to be played. According to an embodiment, the subject apparatus can automatically recognize a connected device and access the audio signals on that device and/or other information associated with the audio signals, such as titles, artists, length in time, and/or album.

Figure 1:
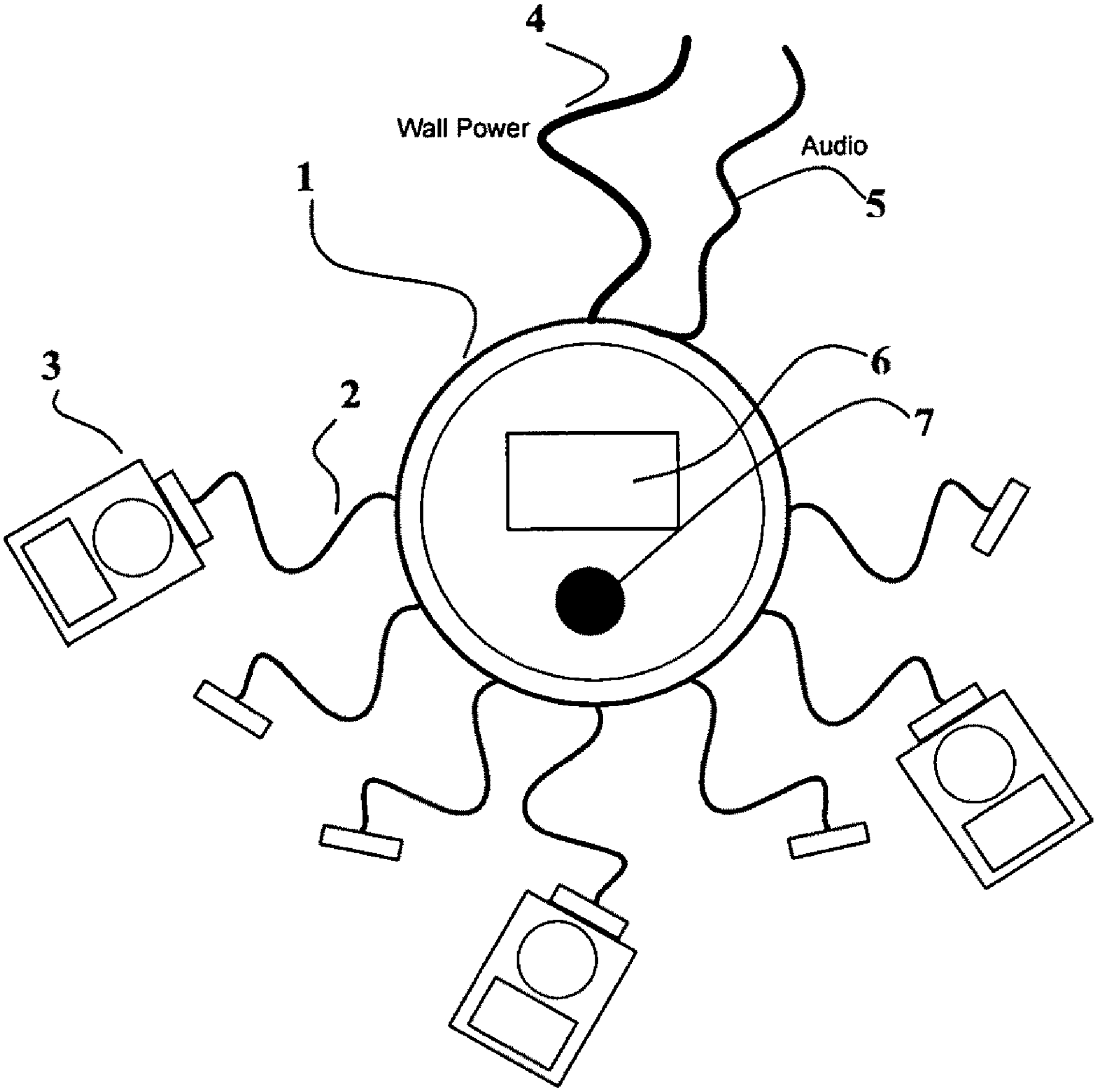
FIG. 1 shows a schematic representation of an embodiment of a device in accordance with the subject invention.

In an embodiment, as shown in FIG. 1, a mixing device 1 can include a plurality of connectors 2 each capable of interconnecting with an iPod® 3 or other device capable of storing and playing audio signals. In alternative embodiments, multiple docking stations can be provided such that connectors 2 may not be needed. In yet another embodiment, wireless connections can be provided. Accordingly, the receipt of a device capable of sharing and playing a signal file can be accomplished via a variety of ways, including via cable, wireless, or other techniques. For example, a Bluetooth® WiFi, or RF connection can be used. The device 1 can include a power line 4 for connecting to a wall socket. The power line can be AC or DC. Alternatively, the device can rely on batteries, or have a combination of AC, DC, and batteries. Audio cables 5 can be used to send audio signals to an external sound system, such as an amplifier or speakers. In one embodiment, the device 1 can include a display screen 6 and a control wheel 7.

Embodiments of the invention provide a user with the ability to mix multiple devices capable of storing and playing music such as iPods®, into one standard stereo signal that can then be played on a sound producing device, such as powered speakers or amplifier. The subject apparatus is capable of sending the stereo signal to any device capable of receiving audio as input. For example, the subject apparatus can be adapted to provide an output port similar to the output port of an iPod® or other device such that a cable suitable for an iPod® or other device accessory can connect to the output audio signal. The device capable of storing and playing music is preferably an iPod®, but specific embodiments are not limited thereto. In accordance with embodiments of the present invention, autonomous mixing can be accomplished by the device. Autonomous mixing actions by the device can include one or more of the following features: automatic iPod® detection, including capabilities of connecting to the iPhone®, iPod Touch®, iPod Classic®, iPod Nano®, and iPod Mini®; stereo audio mixing, including providing line level output; autonomous DJ mode, including providing random song playback; iPod® charging circuit; one hand operation, jog wheel with center select; graphical liquid crystal display (LCD) that can be used for displaying system information, and may include automatic backlight dimming; robust; low power; field upgradable; and visually pleasing;

Embodiments of the present invention can be implemented with a microcontroller based system that incorporates both analog and digital components. The device can be divided up into the following sub-systems: (1) Power, (2) Audio Mixer, (3) Controller, (4) User Interface, (5) Device Communication, and (6) Enclosure.

Figure 2:
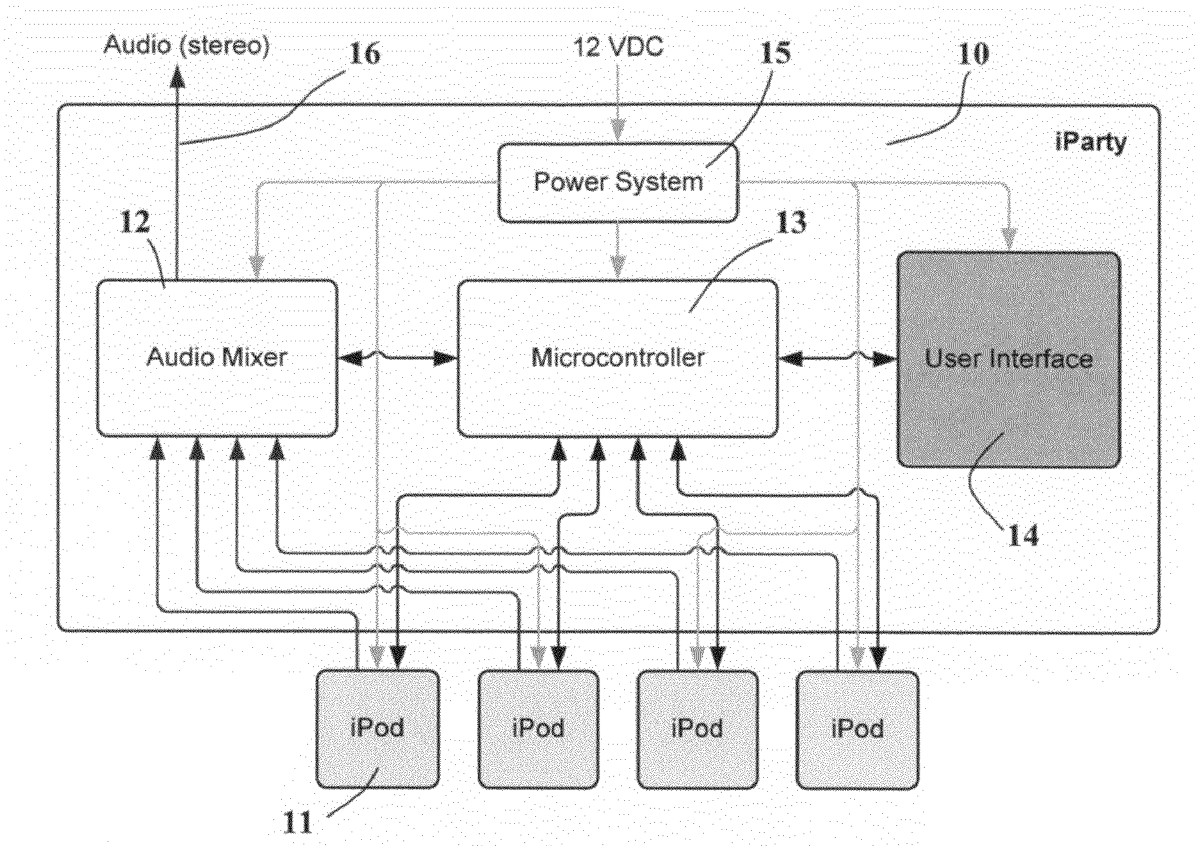
FIG. 2 shows a system level design according to an embodiment of the subject invention.

A system level view of a specific embodiment is presented in FIG. 2. Referring to FIG. 2, a mixing device 10 can mix a plurality of iPods® 11 or other devices capable of storing and playing audio signals. Each iPod® 11 can connect to an input of an audio mixer 12 and a controller. The controller can be, for example, a FPGA, a microprocessor, or a microcontroller. The embodiment of FIG. 2 uses a microcontroller, and this embodiment with a microcontroller will be described, while the description applies to other controllers. The microcontroller 13 communicates with the audio mixer 12 and a user interface 14. A power system 15 can be used to provide power to the components of the device 10, including the audio mixer, microcontroller, and user interface. The power system 15 can supply power to a connected iPod® 11. An audio output 16 can send an audio signal from the audio mixer to an external system such as a stereo.

Figure 3:
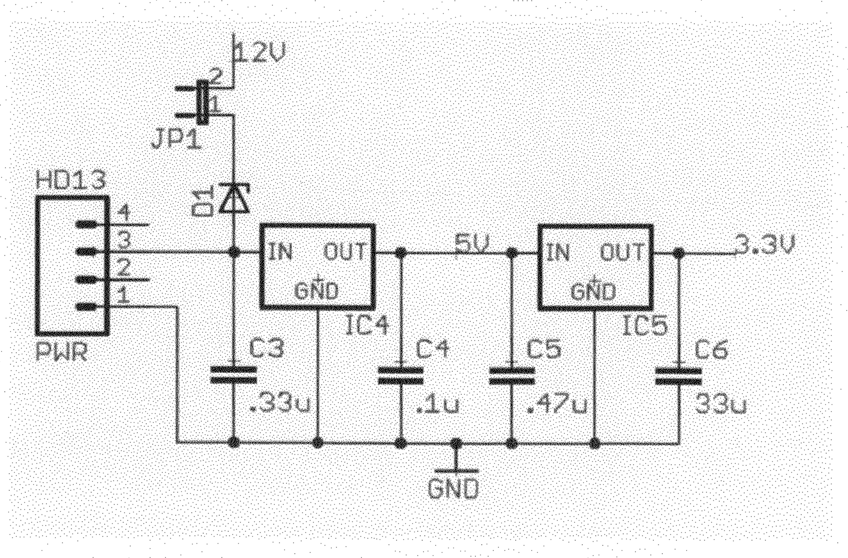
FIG. 3 shows a schematic of a power system according to an embodiment of the subject invention.

In a specific implementation, the subject device accepts a 12 volt DC input signal from a standard regulated AC adapter. The 12 V source can be used to charge connected devices and can be used as an input into two voltage regulators. In one embodiment, the voltage regulators are component parts LM7805 and LM3940. Two voltage regulators are used in this implementation to provide two voltage levels, 5 and 3.3 volts, as required by various system components. The complete power circuit of this specific implementation is presented in FIG. 3. The power circuit of FIG. 3 can be used as the power system 15 of FIG. 2. The power being supplied to the subject apparatus to perform the audio signal playback can be provided from different sources, including a wall socket, adapter, internal battery, or the battery of one or more of the connected devices capable of storing and playing audio signals.

Under normal operating conditions with two connected iPod Minis®, an embodiment of the subject device may consume approximately 5 watts.

Figure 4:
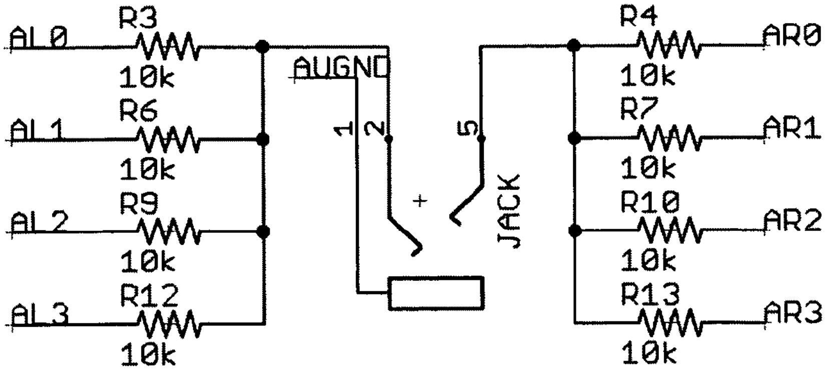
FIG. 4 shows a schematic of an audio mixing circuit according to an embodiment of the subject invention.

The audio mixing circuit (reference 12 of FIG. 2) can be implemented using passive components. The benefits of using only passive components can be seen in the simplicity of the circuit shown in FIG. 4, which can be used for mixing up to four iPods®. Referring to FIG. 4, the audio mixing circuit can include a plurality of resistors connected at one end to an output channel. Each resistor is connected at its opposite end to a corresponding iPod® channel. In a specific implementation, four resistors, R3, R6, R9, and R12, for a left audio channel and four resistors, R4, R7, R10, R13, for a right audio channel are provided. The four resistors (R3, R6, R9, and R12), which are connected to the left audio channel of the iPods® (signal lines AL0, AL1, AL2, and AL3), are connected to the left channel output of a jack for audio output, and the four resistors (R4, R7, R10, R13) connected to the right audio channel of the iPods® (signal lines AR0, AR1, AR2, AR3) are connected to the right channel output of the jack. The mixing circuit can also add other sounds or video input into the output signals, such as sounds that convey information to the user. Such sounds include clicking, which conveys the turning of the jog wheel. The mixing circuit can also control volume or add effects such as distortion, arena effect, stadium effect, or music hall effect.

Figure 5:
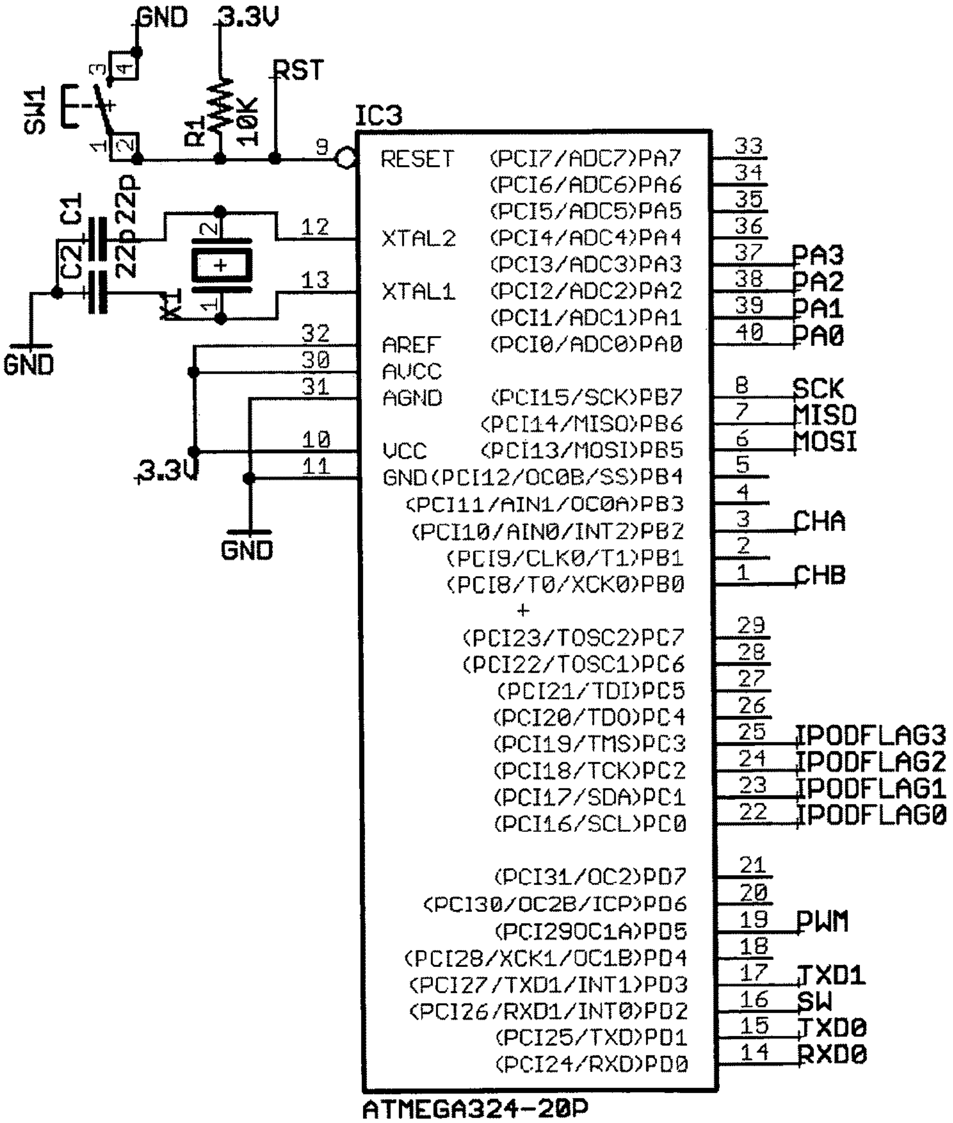
FIG. 5 shows a schematic representation of an Atmel AVR ATMEGA324-20P microcontroller and clock and reset circuitry.
Figure 8:
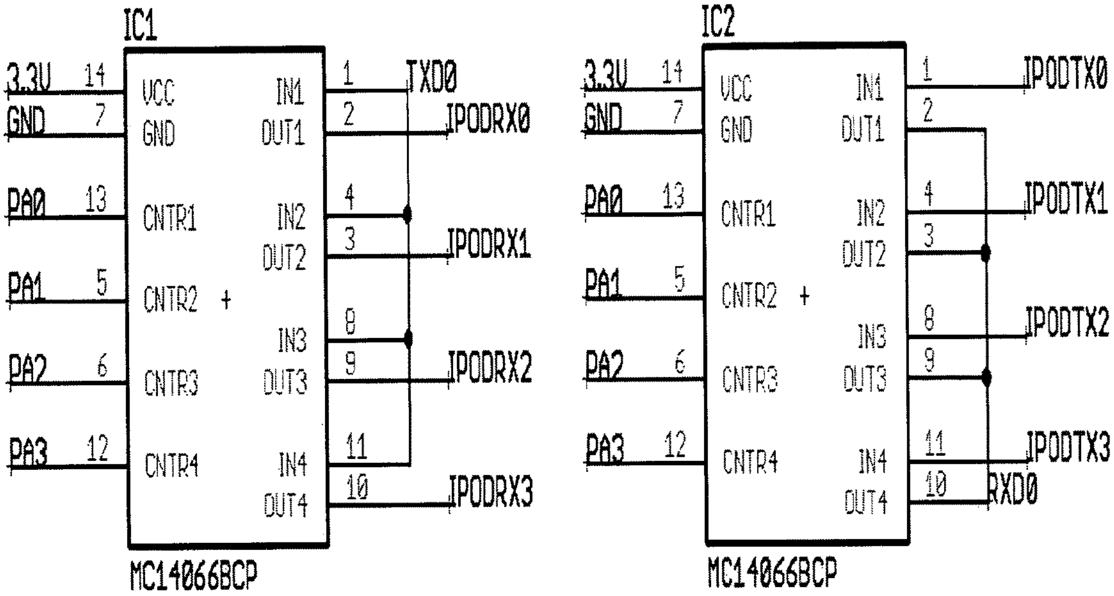
FIG. 8 shows a schematic representation of electric switches for serial communication.

In one embodiment, the microcontroller can be an Atmel AVR ATMEGA324-20P microprocessor. The schematic for the Atmel microcontroller is shown in FIG. 5. Other microprocessors or microcontrollers can be used. For example, in certain implementations, any microcontroller that meets the following specifications may be used: 2 full duplex Universal Synchronous Asynchronous Receiver Transmitters (USARTs), 18 programmable Input/Output (IO) pins, external crystal support, 3.3V operation, a minimum of 32 KB programmable memory, multiple timers, and external interrupts. In an implementation, a PDIP (plastic dual in line) package, C programming support, in-circuit serial programming, and in-circuit JTAG debugging can be useful. According to embodiments of the present invention, multiple devices capable of storing and playing audio signals can be controlled by a microcontroller regardless of the number of serial ports available to the microcontroller through the use of, for example, electrical switches for multiplexing the communication between the connected devices and the microcontroller. In certain embodiments, when communicating with multiple connected iPods® using a single microcontroller USART, electric switches, such as shown in FIG. 8, can be used to multiplex both the receiving and transmitting signals.

Figure 6:
FIG. 6 shows a knob and rotary optical encoder for use with an embodiment of the subject invention.

For a specific implementation of a user interface (reference 14 of FIG. 2), a knob connected to a rotary encoder, such as the one shown in FIG. 6, can be used as a jog wheel for the main source of user input. The rotary encoder can also incorporate a momentary switch allowing 3 functions: rotate left, rotate right, and center select. With these 3 functions the user can control an embodiment of the subject device.

Figure 7:
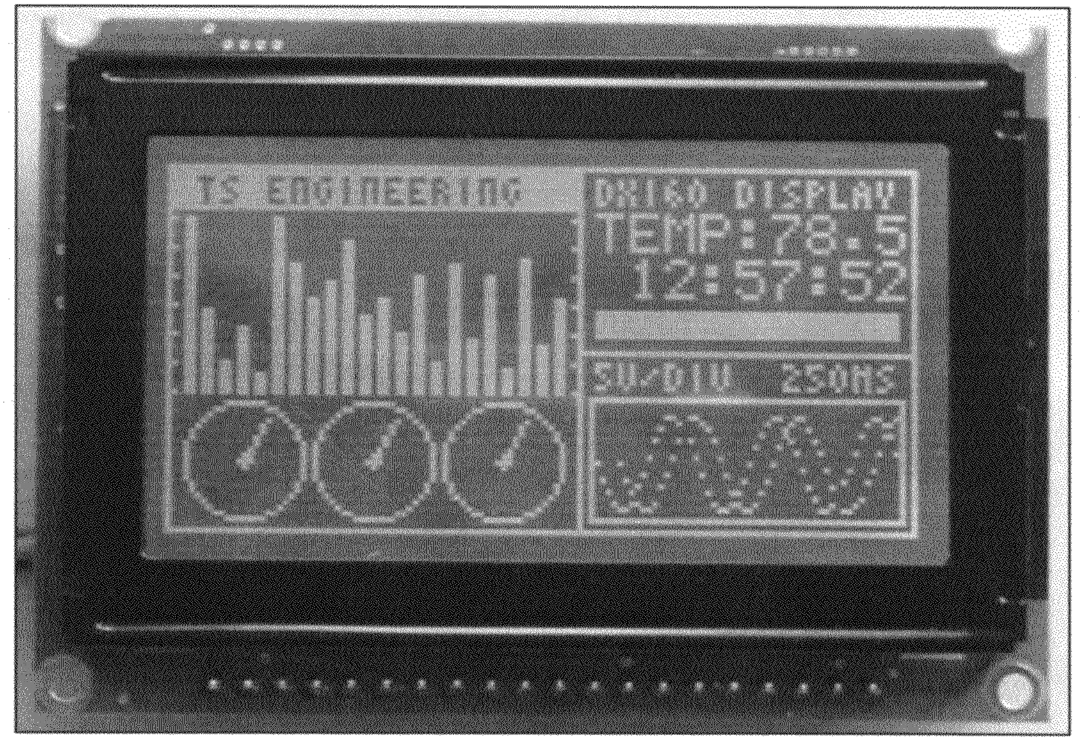
FIG. 7 shows a graphical LCD for use with an embodiment of the subject invention.

A graphical liquid crystal display (LCD), such as shown in FIG. 7, can be used to provide the visual output to a user.

During song playback the LCD can display system information such as which iPod® is currently playing and how many devices are connected. In addition, track information and song time can be displayed. The combination of the LCD with the jog wheel can provide a user with a simple yet powerful experience.

Embodiments of the present invention provide an apparatus and method for autonomous mixing of multiple devices capable of storing and playing audio signals. In autonomous mode, no user interaction is required. The subject apparatus can continuously perform as long as a power source is available. The available power source can be the battery of the device capable of storing and playing audio signals. Connected devices can be removed and added at any time without additional input from a user, this function can be referred to as "hot pluggable" or "hot swappable." The subject apparatus can detect a new device. The resources from the new device are immediately accessible and available as resources of the subject apparatus. Similarly, when a connected device is removed, the resources of the now disconnected device can be automatically removed from the general available resources of the subject apparatus.

Autonomous operation can include, but is not limited to random-random operation, semi-random operation, and random-less operation. In random-random operation, the subject apparatus can randomly select a connected device and then randomly select a music/video item off of the selected device. In semi-random operation, the subject device can randomly select a connected device and then play a user's pre-defined selection or can select the connected devices in a determined order and then randomly select a music/video item off of the selected device. The pre-defined selection can be provided by the functions of the device capable of storing and playing audio signals before or after the device is connected to the subject apparatus. For example, three devices can be connected to the subject apparatus. The first device can be set to random/shuffle mode, the second device can be set to play only audio tracks by a specific musical artist, and the third device can be set to play all music of the Classic Rock genre. In random-less operation, the subject apparatus can select from connected devices in a predetermined order. The predetermined order can continue indefinitely by looping continuously until a user stops the loop, power is removed, or all the devices are removed. When a device is removed, the loop can continue, but ignore the disconnected device. In one example of the random-less operation, three devices can be connected to the subject apparatus having a predetermined playing order of device 2, device 3, device 1, and, device 4. The connected device can be set to have a pre-defined selection. For this example, a song from the second device, which can have a pre-defined selection to play all tracks by a specific artist, plays first. Next, a song from the third device, which can have a pre-defined selection to play all music of the Classic Rock genre, can be played. Then, a song from the first device, which can have a pre-defined selection to play random/shuffle, can be played. Because no fourth device is attached, the next song can be selected from the second device.

Certain embodiments of the present invention can include one or more autonomous mixing settings. In further embodiments, manual operation is available. For manual operation, some user interaction is required. In one embodiment, the subject apparatus is capable of performing standard iPod interface operations such as playlist access and genre selection. According to such an embodiment, the subject apparatus can mimic the standard iPod interface while using the resources (e.g., music, video, podcast, movie, TV show) of all connected devices available. The menus and lists can treat the resources of the connected devices as a single source for resources. According to an embodiment, the libraries of the connected devices can appear to be merged into a single library such that the resources of multiple devices appear as a single device.

Referring to FIG. 2 and FIGS. 9-13, the operation of an embodiment of the mixing device 10 can involve an initialization step (S100) when the device is powered. In one embodiment, the initialization step sets data directions and enables appropriate interrupts. After initialization, a graphical interface portion of the user interface 14 can display splash screen (S110). The mixing device 10 then determines if a device, such as an iPod® 11, is already connected (S120). If a device 11 is connected, then the graphical user interface portion updates and the connected device 11 can be played (S150). If a device 11 is not currently connected then the graphical user interface portion displays connection screen (S130). In one embodiment, the connection screen can recite "PLEASE CONNECT DEVICES." The mixing device continues to check for a new device connection (S140), and once it is determined that a device is connected, the graphical user interface portion updates and the connected device can be played (S150). During play and screen update (S150), time information on the playing song can be obtained (S160) and the display can be updated continuously (S170). This flow chart represents a case where during song playback, a graphical user interface can display song selection and song time information.

While in autonomous playing mode, the sequence of tracks can be randomly selected. In one embodiment, both the iPod® selection and track to be played are randomly selected for play. Autonomous playing mode can be accomplished by sending an audio signal of an initial track from a first iPod® through the mixing circuit of the autonomous device to the external stereo audio output. Then, a next track can be selected. The next track is capable of being provided from any of the iPods® connected to the mixing circuit. The audio signal of the next track can be sent through the mixing circuit to the external stereo audio output. Selecting the next track can include randomly selecting an iPod® from the iPods® that are connected to the device and playing a track from the randomly selected iPod®. In another embodiment example, selecting the next track can include sequentially selecting an iPod® from the iPods® that are connected to the device and playing a track from the randomly selected iPod®. The selecting of the next track can be performed, for example, after determining that less than 1 second is remaining on the track time of the track having its audio signal sent through the mixing circuit. While a track is playing, the remaining track time can be displayed on the LCD screen.

According to certain embodiments, a variety of transitions can be utilized between tracks. In one example, the end of a playing track can fade into the beginning of the next track. In another embodiment, an overlap period can be provided such that the next track begins playing while the first track is ending.

The autonomous playing mode can be interrupted by an external user selection. Furthermore, the basic commands for interacting with the iPods® can be made available to a user. For example, shuffling of songs, playlist access, and obtaining track information can be utilized.

Figure 9:
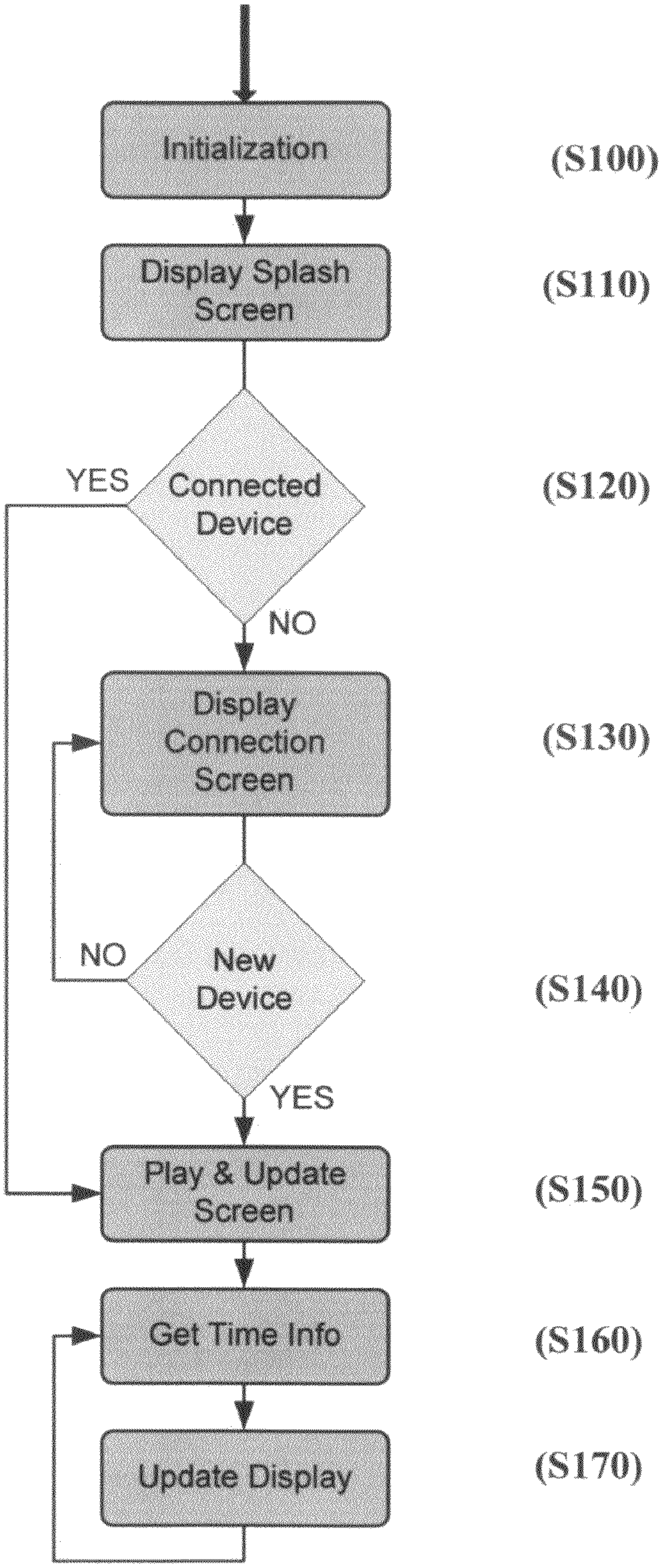
FIG. 9 shows a main process flow according to an embodiment of the subject invention.
Figure 10:
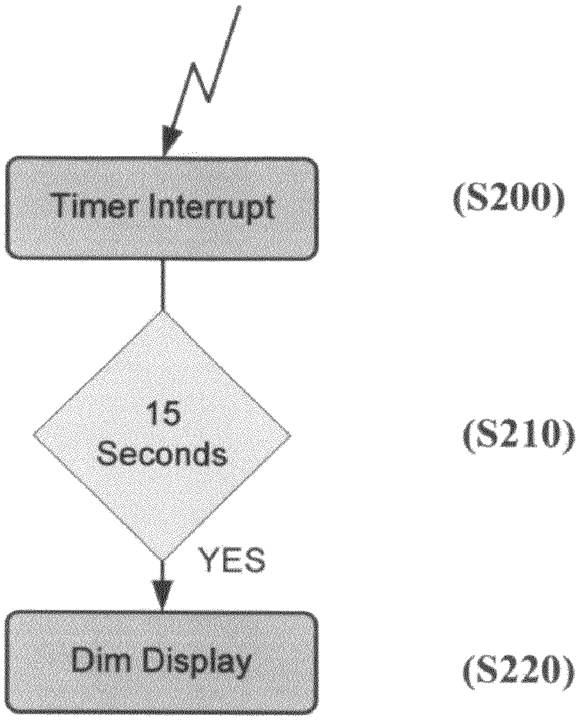
FIG. 10 shows a timer interrupt process flow according to an embodiment of the subject invention.
Figure 11:
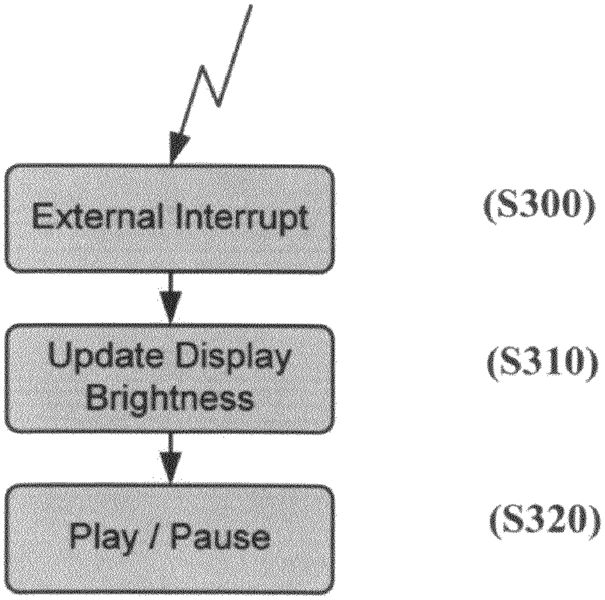
FIG. 11 shows a center select interrupt process flow according to an embodiment of the subject invention.
Figure 12:
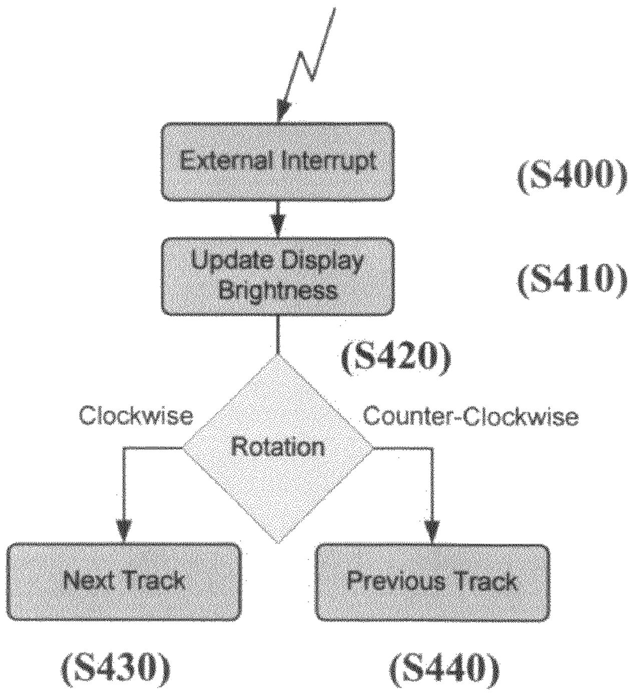
FIG. 12 shows a jog wheel interrupt process flow according to an embodiment of the subject invention.
Figure 13:
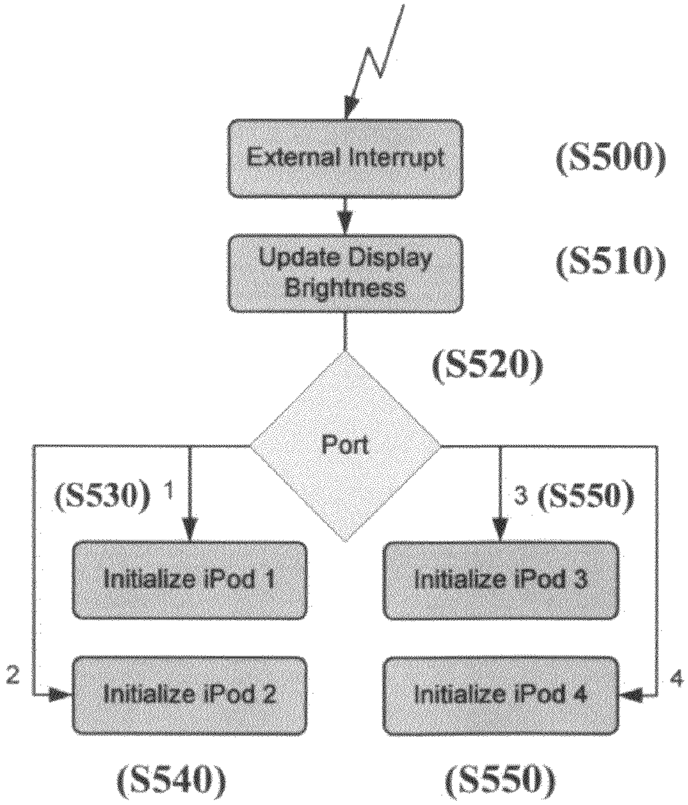
FIG. 13 shows a connected device interrupt process flow according to an embodiment of the subject invention.

The regular operation flow chart of FIG. 9 can be affected by a variety of interrupts. Referring to FIG. 10, a timer interrupt (S200) can be enabled such that after a set period of time, 15 seconds for example, (S210), the display can be dimmed (S220). The dimming of the display can decrease power consumption of the mixing device. Referring to FIG. 11, an external interrupt (S300) such as a requested action for playing or pausing a song can instigate an update of the display brightness (S310). Then the action such as Play or Pause can be performed (S320). Referring to FIG. 12, an external interrupt (S400) such as a requested action to change tracks can instigate an update of display brightness (S410). Then, for a jog wheel input signal rotation (S420), a clockwise rotation scrolls to a next track (S430) and a counter-clockwise rotation scrolls to a previous track (S440). Referring to FIG. 13, an external interrupt (S500) such as for connecting an iPod® 11 to the mixing device 10 can instigate an update of the display brightness (S510). Then in response to port detection (S520), a connected device can be initialized (S530, S540, S550, S560).

For the prototype example, the ATMEGA324-20P microcontroller was programmed using C, GCC compiler, and AVRDUDE programmer. The programming follows the software flow charts presented in FIGS. 9-13.

Figure 14:
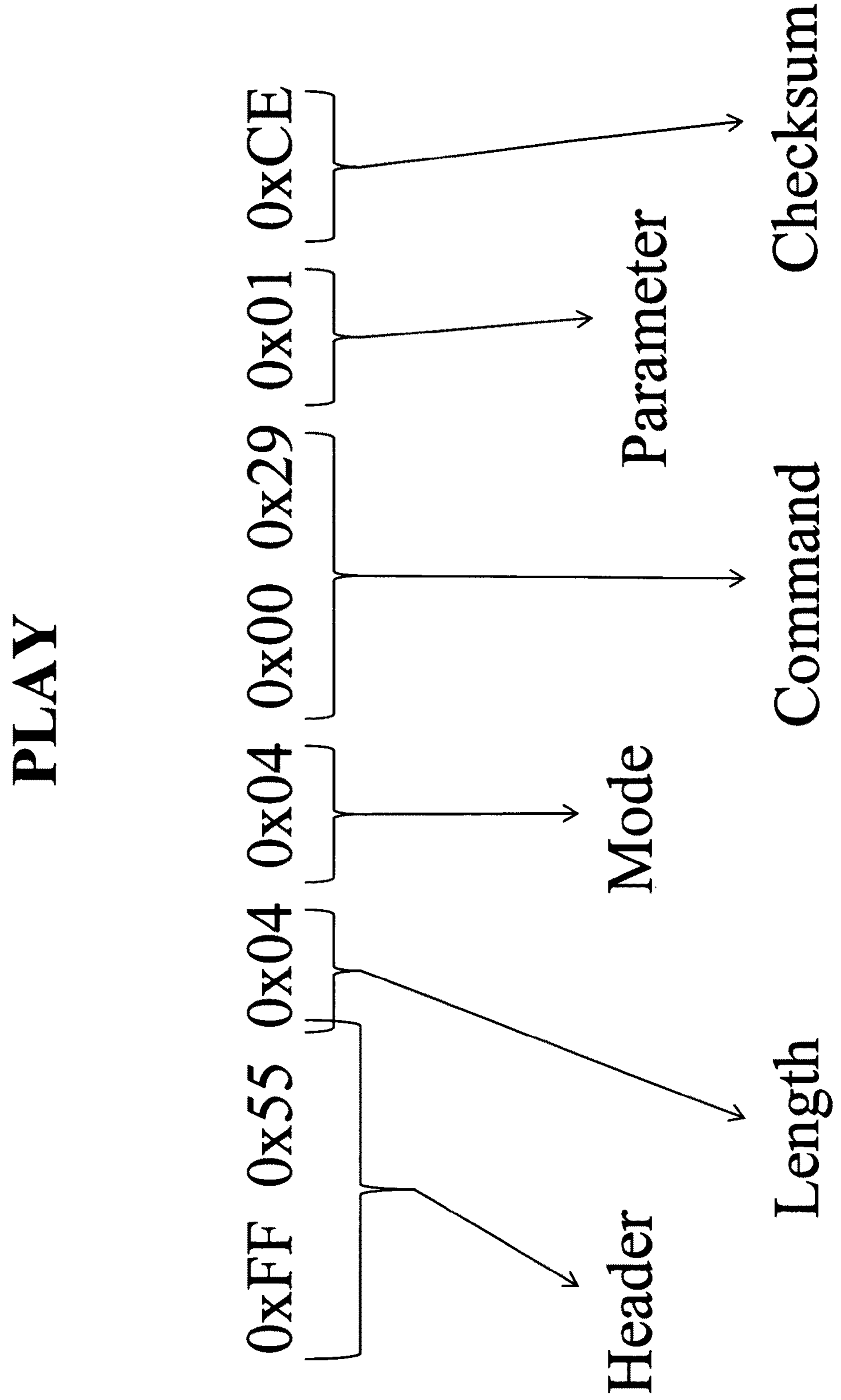
FIG. 14 shows serial communication for use in accordance with an embodiment of the subject invention.

According to a specific implementation, to control the connected iPods®, the microcontroller sends specific commands via 19200 bits per second serial communication using standard 8N1 settings. The transmitted commands may follow a strict ordered structure as shown in Table 1 and FIG. 14.

TABLE 1 iPod ® communication

| Packet | Size(bytes) | Description |
|---|---|---|
| Header | 2 | 0xFF 0x55 |
| Length | 1 | Total number of bytes for mode, command, and parameter |
| Mode | 1 | Mode of current connected device operation |
| Command | 2 | Command sent or received from connected device |
| Parameter | 0 to 100 | Optional, used by some commands for additional information |
| Checksum | 1 | 0x100 - (Length + Mode + Command + Parameter) |

For example, to tell an iPod® to play the currently selected song the following bytes are serial transmitted: 0xFF 0x55 0x04 0x04 0x00 0x29 0x01 0xCE A list of frequently used commands is presented in Table 2.

TABLE 2

Frequently used commands

| Command | Parameter | Description |
|---|---|---|
| 0x01 0x02 | NA | Change to Mode 2 operation |
| 0x01 0x04 | NA | Change to Mode 4 operation |
| 0x00 0x29 | 0x01 | Play/Pause |
| | 0x02 | Stop |
| | 0x03 | Next Track |
| | 0x04 | Previous Track |
| | 0x05 | Fast Forward |
| | 0x06 | Rewind |
| 0x00 0x1E | NA | Return current position in playlist |
| 0x00 0x1C | NA | Return track time |

Figure 15A:
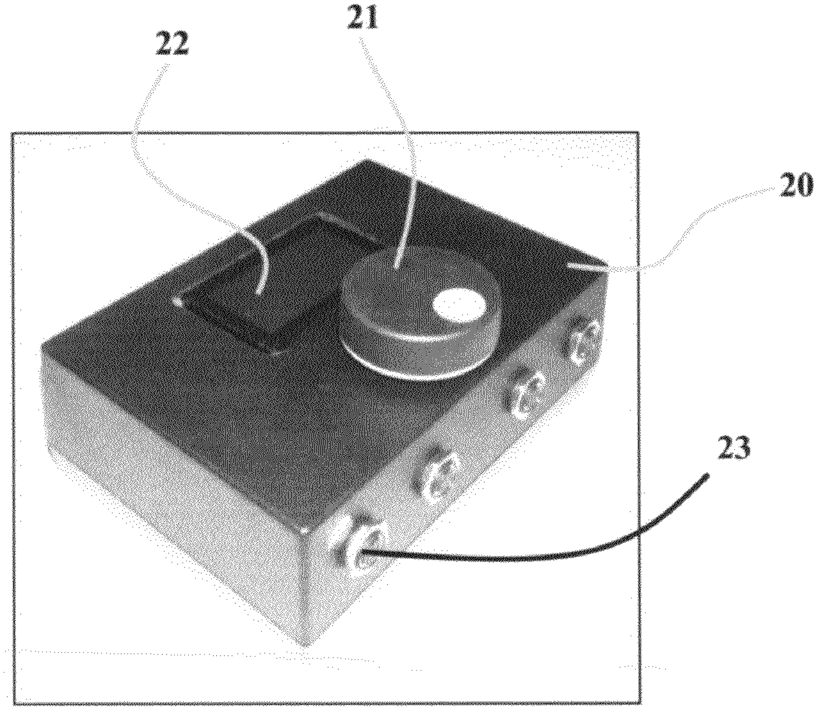
FIGS. 15A and 15B show a perspective view and top view, respectively of an enclosure design in accordance with an embodiment of the subject invention.
Figure 15B:
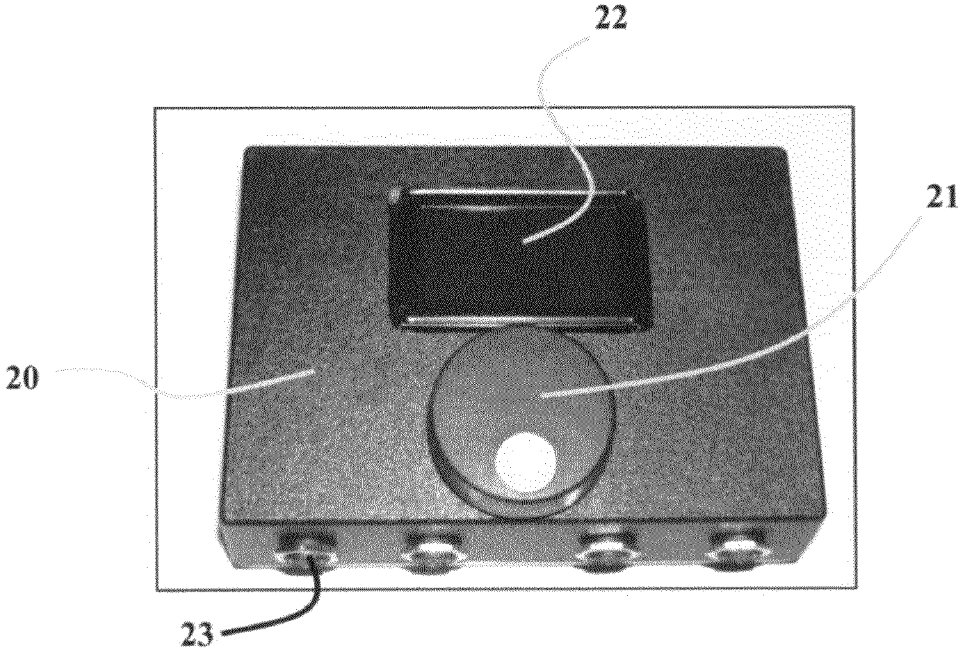
Figure 16:
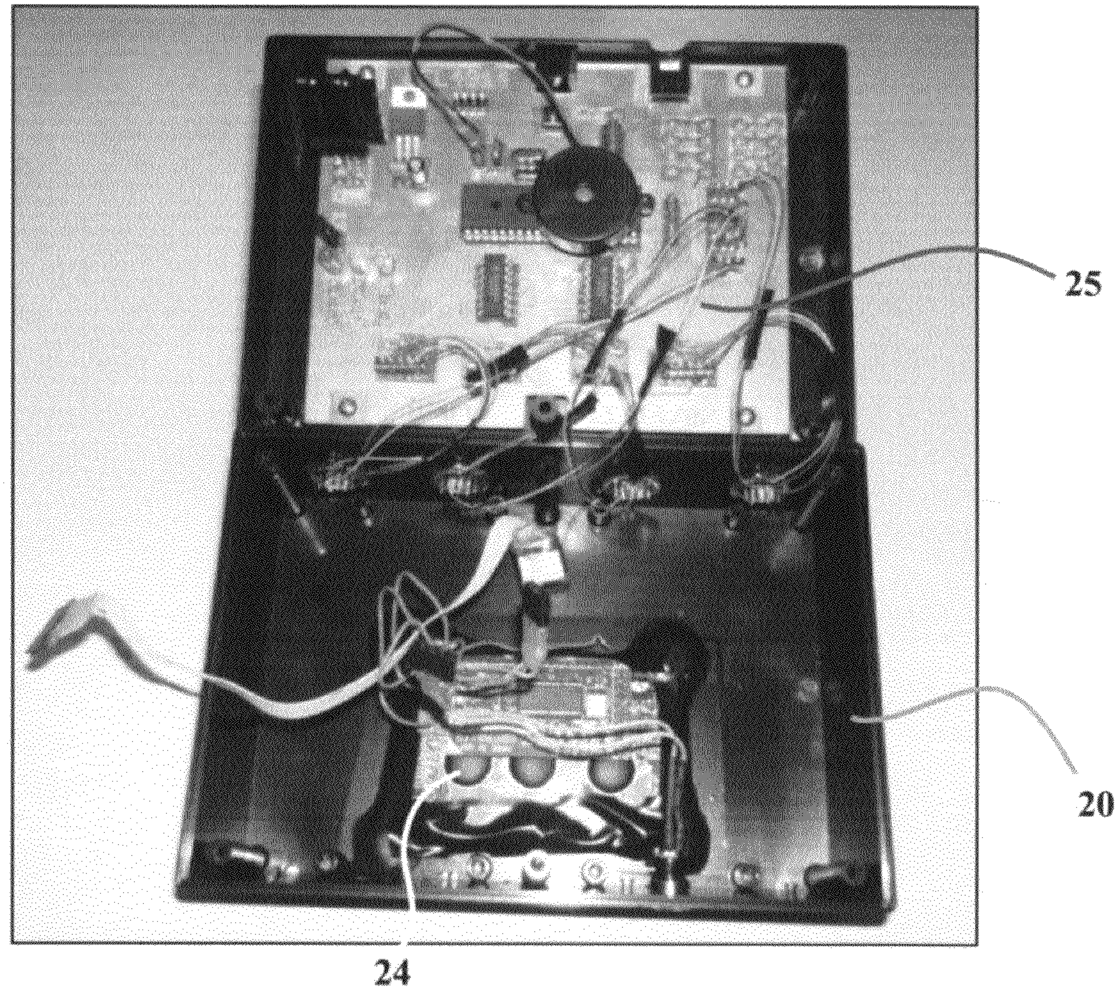
FIG. 16 shows a sectioned view of an enclosure design and circuitry in accordance with an embodiment of the subject invention.

The subject device apparatus can be provided having any suitable package design. In one embodiment, as illustrated in FIGS. 15A, 15B and 16, the subject device can be enclosed in a plastic 20 case with a jog wheel 21, LCD panel 22, and iPod® connection ports 23. In certain embodiments, docking stations can be used in place of the connection ports 23. Referring to FIG. 16, the internal circuitry 24 of the LCD display can be a separate circuit board from the main PCB design 25, but embodiments are not limited thereto. The enclosure design shown in FIGS. 15A, 15B, and 16 was first designed using the CAD software, SolidWorks. After a preliminary design was completed, a generic ABS plastic enclosure was modified to match the design. It should be noted that the illustrated design is merely an example design, and other designs can be utilized.

Figure 17:
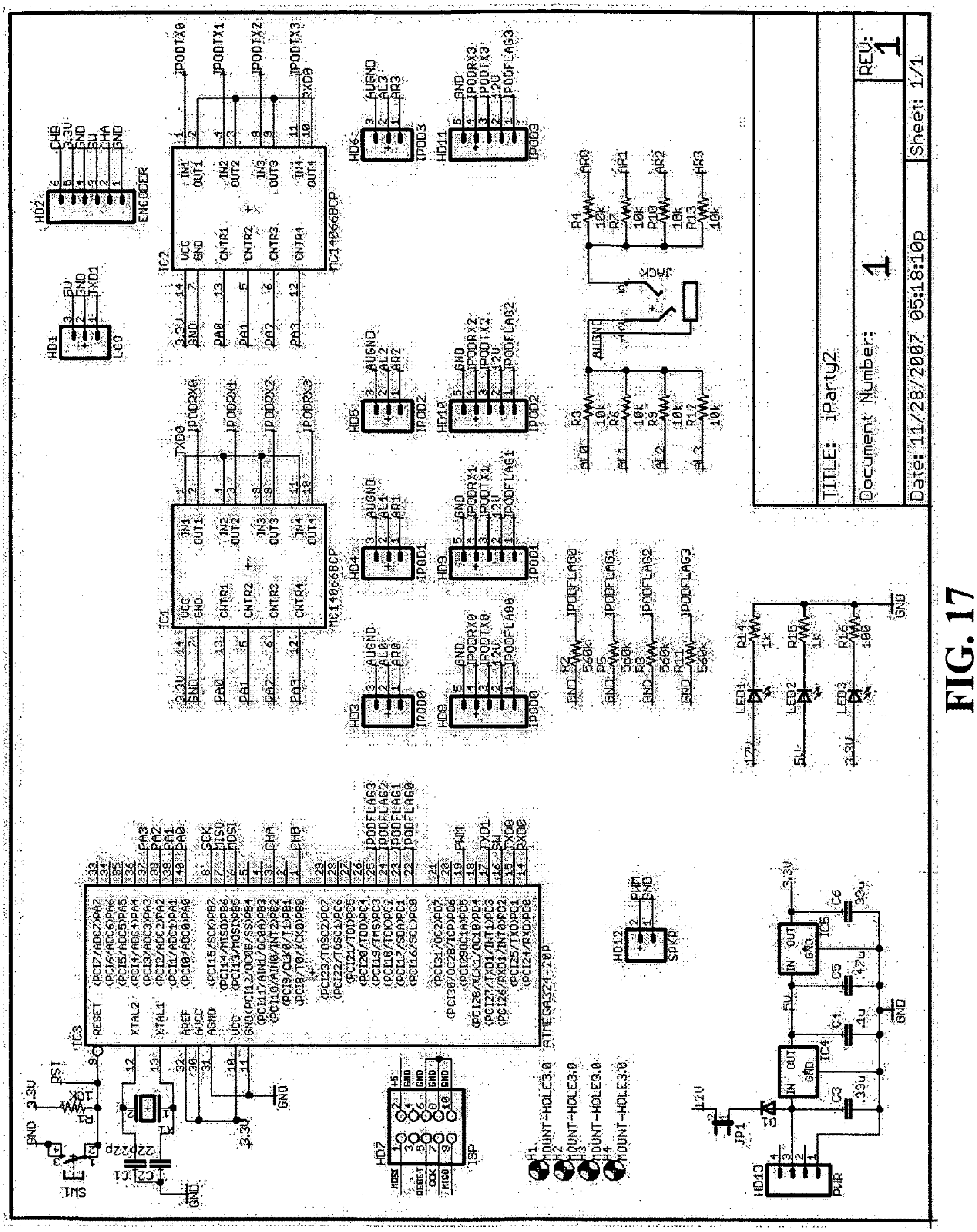
FIG. 17 shows a system schematic of an embodiment according to the subject invention.
Figure 18:
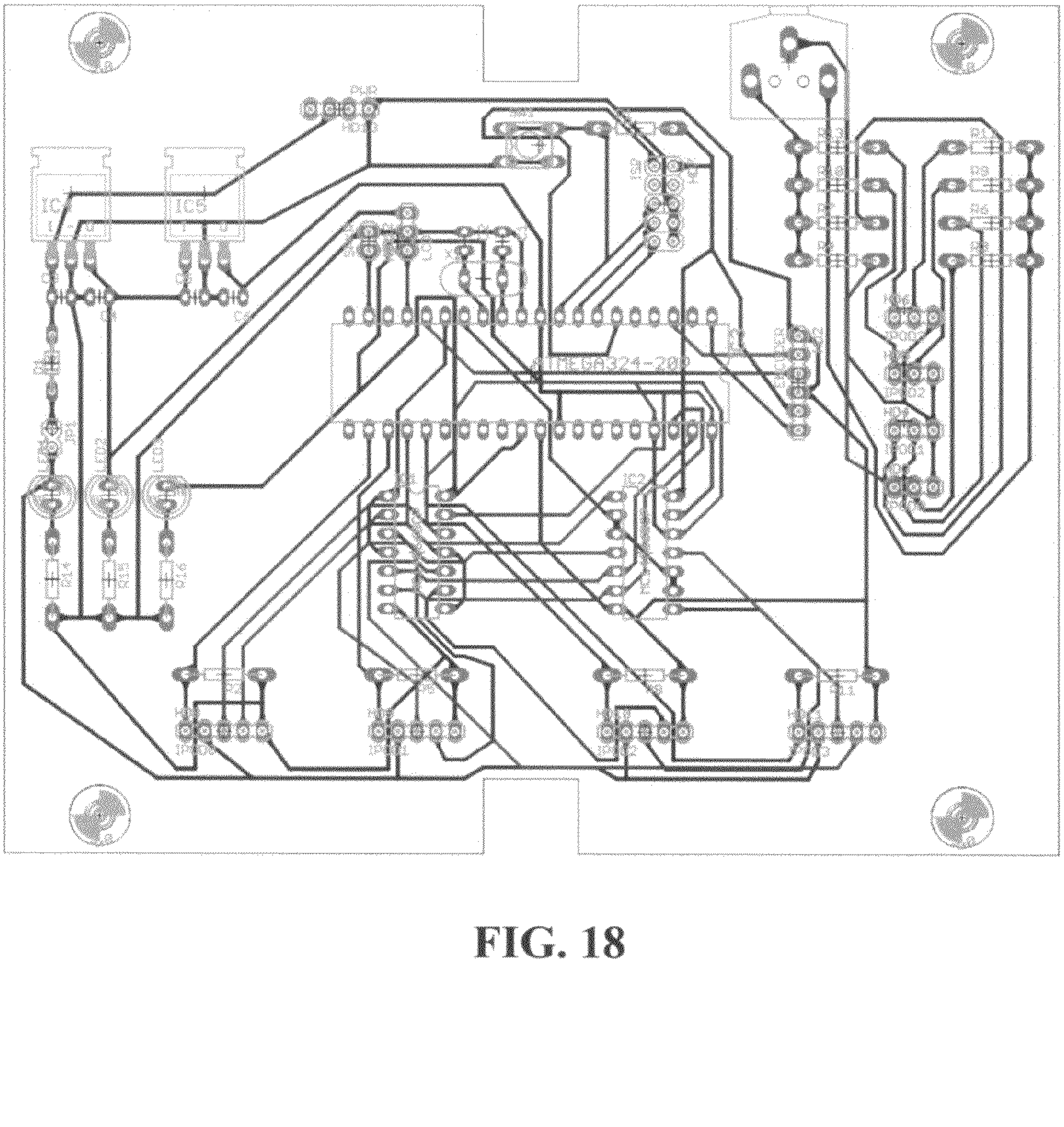
FIG. 18 shows a printed circuit board design for the system schematic of FIG. 16 according to an embodiment of the subject invention.
Figure 19A:
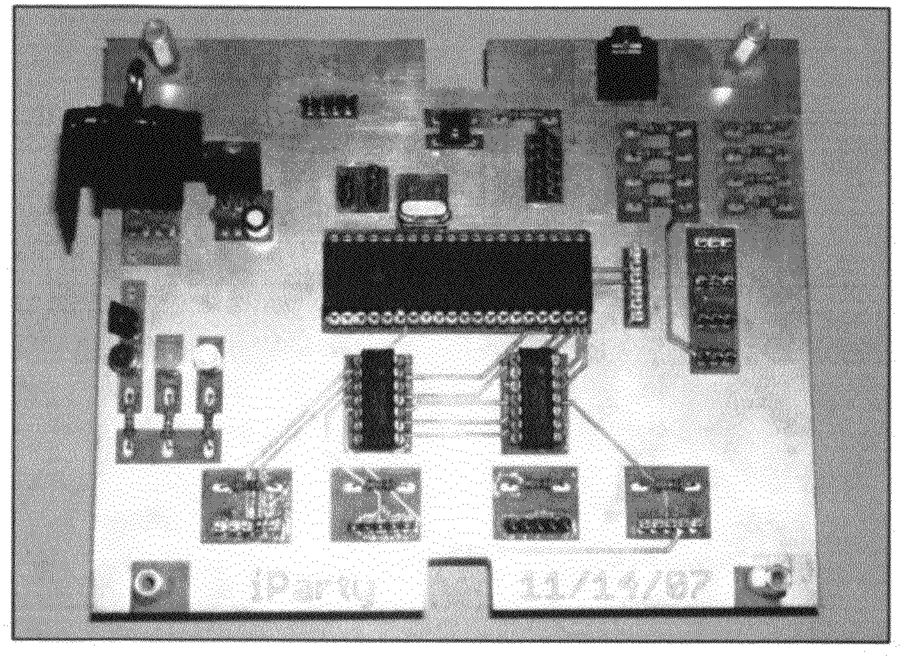
FIGS. 19A and 19B show a front side view and back side view, respectively of a printed circuit board with soldered components in accordance with an embodiment of the subject invention.
Figure 19B:
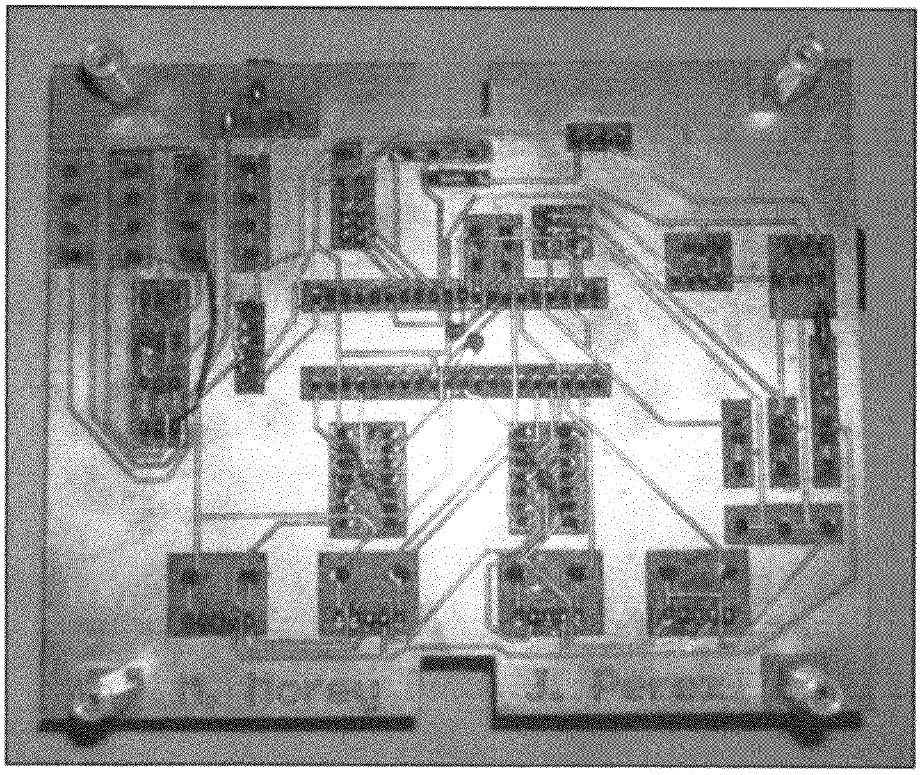

Referring to FIGS. 17, 18, 19A and 19B, a device was built. FIG. 17 shows a schematic and FIG. 18 shows a PCB layout design for the schematic of FIG. 17. FIGS. 19A and 19B show a front view and back view, respectively, of the prototype board. A complete list of parts used in the device can be seen in Table 3 and Table 4.

TABLE 3

| Non-PCB mounted materials | | |
|---|---|---|
| Device | Package | Description |
| DX160-B | 3" × 2.1" PCB and metal frame | Serial graphic LCD 128 × 64 pixels |
| EM14A0D-B28-L008S | Axial | 14 mm rotary optical encoder with switch |
| ABS Enclosure | 6.9" × 4.9" × 2.5" black ABS plastic | Compact ABS electronics enclosure |
| Knob | ¼" shaft diameter | Comfort grip finger control knob |
| iPod Cables | 10' | iPod dock to 8 pin mini-din |
| Mini-din | Panel | iPod dock to 8 pin mini-din |
| AC Adapter | 2 prong wall wart | AC to DC |
| Power Jack | Type N | Female jack for AC adapter |

TABLE 4

| PCB mounted materials | | | | |
|---|---|---|---|---|
| Part | Value | Device | Package | Description |
| C1, C2 | 22 pF | CAP | AXIAL(025X050) | External crystal charging circuit |
| C3 | .33uF | | | Power supply filter capacitor |
| C4 | .1uF | | | |
| C5 | .47uF | | | |
| C6 | 33uF | | | |
| D1 | 1N4001 | DIODE | DO-41 | Power source protection |
| HD1 | LCD | MALE HEADER | 1X3 | LCD connector |
| HD2 | ENCODER | | 1X6 | Jog wheel connector |
| HD3-6 | IPOD0-3 | | 1X3 | iPod connector |
| HD7 | ISP | | AVR_ICSP | AVR ICSP header |
| HD8-11 | IPOD0-3 | | 1X5 | iPod ® audio connector |
| HD12 | SPKR | | 1X2 | Speaker connector |
| HD13 | PWR | | 1X4 | Power connector |
| IC1, IC2 | MC14066BCP | MC14066BCP | DIP14 | Quad analog switch/quad multiplexer |
| IC3 | ATMEGA324-20P | ATMEGA324-20P | DIL40 | 8-bit RISC microcontroller |
| IC4 | LM7805 | VOLTAGE | TO-220 | 12 V to 5 V |
| IC5 | LM3940 | REGULATOR | TO-220 | 5 V to 3.3 V |
| JACK | HEADPHONE | STEREO AUDIO JACK | LOW PROFILE 3.5 MM | Stereo audio out |
| JP1 | | JP1E | 1X02 | Charging circuit enable |
| LED1 | GREEN | LED | LED5MM | 12 V indicator |
| LED2 | YELLOW | | | 5 V indicator |
| LED3 | RED | | | 3.3 V indicator |
| R1, R3, R4, R6, R7, R9, R10, R12, R13 | 10k O | RESISTOR | AXIAL(0207) | Reset line and audio mixing circuit |
| R2, R5, R8, R11 | 560k O | | | Device detection pull-down resistor |
| R14, R15 | 1k O | | | LED current limiter |
| R16 | 100O | | | |
| SW1 | | MSWITCH | TACTILE SWITCH | Reset |
| X1 | 7.3728 MHz | CRYSTAL | HC-49U | External quartz crystal |

It should be noted that the list of parts for the device described above are only described in detail for purpose of illustration, and should not be construed as limiting. For example, other amplified audio mixing circuits, LCDs with faster response times, a louder clicker, shorter connection cables, and surface mounted components may be used.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. An apparatus for signal mixing, comprising:

a signal mixing circuit capable of receiving a plurality of input signals and outputting at least one output signal, wherein the at least one output signal comprises a mixing of the plurality of input signals;

a plurality of receiving ports, each receiving port capable of receiving a device capable of storing a plurality of signal files and outputting a signal, wherein the signal is at least a portion of one of the plurality of signal files stored on the received device, wherein the received devices provide the plurality of input signals directed to the signal mixing circuit;

a controller capable of sending a first command signal to one or more of the received devices to cause the one or more of the received devices to output a corresponding one or more of the plurality of input signals, wherein the apparatus is capable of providing autonomous mixing of the plurality of input signals.

2. The apparatus according to claim 1, wherein the plurality of signal files is a plurality of audio signal files.

3. The apparatus according to claim 1, wherein the plurality of signal files is a plurality of video signal files.

4. The apparatus according to claim 1, wherein the received devices are portable devices.

5. The apparatus according to claim 1, further comprising: a power system capable of providing power to one or more of the received devices.

6. The apparatus according to claim 1, wherein the apparatus is capable of receiving power from at least one of the received devices.

7. The apparatus according to claim 1, wherein the at least one output signal is a single output signal.

8. The apparatus according to claim 1, wherein at least one of the plurality of receiving ports is wireless.

9. The apparatus according to claim 1, further comprising: a user interface;

wherein the controller is further capable of communicating with the user interface.

10. The apparatus according to claim 9, wherein the controller creates a library that incorporates information with respect to signal files from at least two of the received devices.

11. The apparatus according to claim 10, wherein the library incorporates information with respect to the signal files from all of the received devices.

12. The apparatus according to claim 9, wherein the user interface comprises a jog wheel, wherein action of the jog wheel causes a control signal to be sent to the controller.

13. The apparatus according to claim 9, wherein the user interface comprises a display screen.

14. The apparatus according to claim 13, wherein the display screen is capable of displaying information with respect to the signal files from the received devices.

15. The apparatus according to claim 1, wherein the controller is capable of selecting a received device, selecting a signal file from the selected received device, and causing the signal mixing circuit to output the selected signal file as the at least one output signal.

16. The apparatus according to claim 15, wherein the controller is capable of operating in a random-random mode, wherein the random-random mode comprises random received device selection and random signal track selection from the randomly selected received device.

17. The apparatus according to claim 15, wherein the controller is capable of operating in a semi-random mode, wherein the semi-random mode comprises random received device selection and pre-defined signal file selection from the randomly selected received device, wherein the pre-defined signal file selection includes a user defined setting for the received device.

18. The apparatus according to claim 15, wherein the controller is capable of operating in a random-less mode, wherein the random-less mode comprises predetermined received device selection order and pre-defined signal file selection from the selected received device, wherein the pre-defined signal file selection includes a user defined setting for the received device.

19. The apparatus according to claim 1, wherein at least one receiving port is capable of receiving an iPod®.

20. The apparatus according to claim 1, wherein the controller is capable of sending a second command signal to the one or more of the received devices to cause the one or more received devices to provide the controller with an information signal that provides information regarding the plurality of signal files.

21. The apparatus according to claim 1, wherein the controller is capable of controlling the signal making circuit in order to control the at least one output signal.

22. The apparatus according to claim 1, wherein the received devices are hot pluggable with respect to the plurality of receiving ports such that the devices capable of storing a plurality of signal files and outputting a signal can be received by the plurality of receiving ports and can be removed from being received by the plurality of receiving ports without additional input to the apparatus by a user.

23. The apparatus according to claim 2, further comprising a sound producing device, wherein the sound producing device receives the at least one output audio signal and produces sound corresponding to the at least one audio signal.

24. The apparatus according to claim 3, further comprising a video producing device, wherein the video producing device receives the at least one output video signal and produces video corresponding to the at least one audio signal.

25. A method for signal mixing, comprising:

providing a signal mixing circuit capable of receiving a plurality of input signals and outputting at least one output signal, wherein the at least one output signal comprises a mixing of the plurality of input signals;

providing a plurality of receiving ports, each receiving port capable of receiving a device capable of storing a plurality of signal files and outputting a signal, wherein the signal is at least a portion of one of the plurality of signal files stored on the received device, wherein the received devices provide the plurality of input signals directed to the signal mixing circuit;

providing a controller capable of sending a first command signal to one or more of the received devices to cause the one or more of the received devices to output a corresponding one or more of the plurality of input signals;

receiving at least two devices at a corresponding at least two of the plurality of receiving ports;

sending a first command signal from the controller to one or more of the at least two receiving devices to cause the at least two devices to output a corresponding at least two input signals;

receiving the at least two input signals at the signal mixing circuit and outputting at least one output signal from the signal mixing circuit, wherein the at least one output signal comprises an autonomous mixing of the at least two input signals.

26. The method according to claim 25, wherein the plurality of signal files is a plurality of audio signal files.

27. The method according to claim 25, wherein the plurality of signal files is a plurality of video signal files.

* * * * *